(12) United States Patent
Douthe et al.

(10) Patent No.: US 10,093,060 B2
(45) Date of Patent: Oct. 9, 2018

(54) GUIDE WHEEL FOR ASSEMBLIES FOR FITTING LAYERS OF ARMORING WIRES

(71) Applicant: TECHNIP FRANCE, Courbevoie (FR)

(72) Inventors: Vincent Douthe, Le Grand-Quevilly (FR); Gilbert Laporte, Courbevoie (FR); Fabien Martinez, Courbevoie (FR)

(73) Assignees: TECHNIP FRANCE (FR); Vincent Douthe (FR)

( * ) Notice: Subject to any disclaimer, the term of this patent is extended or adjusted under 35 U.S.C. 154(b) by 292 days.

(21) Appl. No.: 14/904,408

(22) PCT Filed: Jul. 11, 2014

(86) PCT No.: PCT/FR2014/051792
§ 371 (c)(1),
(2) Date: Jan. 11, 2016

(87) PCT Pub. No.: WO2015/004398
PCT Pub. Date: Jan. 15, 2015

(65) Prior Publication Data
US 2016/0193777 A1    Jul. 7, 2016

(30) Foreign Application Priority Data
Jul. 11, 2013   (FR) ...................................... 13 56825

(51) Int. Cl.
*B29C 53/80* (2006.01)
*D02G 3/38* (2006.01)
(Continued)

(52) U.S. Cl.
CPC .......... *B29C 53/8016* (2013.01); *B29C 53/68* (2013.01); *D02G 3/38* (2013.01); *B29K 2307/04* (2013.01); *B29L 2023/22* (2013.01)

(58) Field of Classification Search
CPC .......... B65H 81/00; B65H 81/08; D07B 3/06; D07B 7/14; B29C 53/68; B29C 53/801;
(Continued)

(56) References Cited

U.S. PATENT DOCUMENTS 2,827,757 A * 3/1958 Newton .................. D01H 7/923
57/346
3,059,404 A * 10/1962 Benfer ..................... D07B 7/14
57/13
(Continued)

FOREIGN PATENT DOCUMENTS

FR         2 776 358 A1    9/2008
FR         2 913 364 A1    9/2008
WO    WO 2010/012897 A1    2/2010

OTHER PUBLICATIONS

International Search Report dated Feb. 4, 2015 issued in corresponding International patent application No. PCT/FR2014/051792.
(Continued)

*Primary Examiner* — Shaun R Hurley
*Assistant Examiner* — Bao-Thieu L Nguyen
(74) *Attorney, Agent, or Firm* — Ostrolenk Faber LLP (57) ABSTRACT

A guide wheel (26) for fitting a layer of carbon armor wires around a tubular core (24). The guide wheel (26) has a central cavity (32), an internal circular edge (34), and a peripheral circular edge (38) that extends coaxially at a distance from said internal circular edge (34), the guide wheel (26) includes a plurality of guiding devices (46), each of which is capable of guiding in translation a plurality of carbon armor wires, the guiding devices being mounted around said central cavity (32). The guiding device (46) includes a peripheral redirecting member (50) in order to be able to guide the carbon armor wires to the internal circular edge (34), and a central redirecting member (52) in order to
(Continued)

be able to guide said carbon armor wires through a second curved passageway.

11 Claims, 7 Drawing Sheets

(51) Int. Cl.
  *B29C 53/68* (2006.01)
  *B29K 307/04* (2006.01)
  *B29L 23/00* (2006.01)
(58) Field of Classification Search
  CPC .. B29L 2023/22; B29K 2307/046; D02G 3/38
  See application file for complete search history.

(56) References Cited

U.S. PATENT DOCUMENTS

| | | | | |
|---|---|---|---|---|
| 3,128,216 A * | 4/1964 | Reed | | B29C 31/002 |
| | | | | 156/184 |
| 3,137,985 A * | 6/1964 | Bailey | | B29C 63/105 |
| | | | | 242/156 |
| 3,255,976 A * | 6/1966 | Mede | | B21F 17/00 |
| | | | | 242/436 |
| 3,448,569 A * | 6/1969 | Rose | | D07B 3/06 |
| | | | | 57/15 |
| 4,069,088 A * | 1/1978 | Cottam | | B65H 59/04 |
| | | | | 156/392 |
| 4,120,139 A * | 10/1978 | Terasawa | | D07B 3/00 |
| | | | | 226/189 |
| 5,263,309 A * | 11/1993 | Campbell | | D07B 3/06 |
| | | | | 57/13 |
| 5,282,353 A * | 2/1994 | Kellstrom, Jr. | | D07B 7/04 |
| | | | | 476/36 |
| 5,293,739 A * | 3/1994 | Brockmanns | | D01H 9/008 |
| | | | | 57/263 |
| 5,581,990 A * | 12/1996 | Van Giel | | D07B 1/0653 |
| | | | | 57/13 |
| 7,468,113 B2 * | 12/2008 | Colson | | B29C 53/8016 |
| | | | | 156/172 |
| 7,815,141 B2 * | 10/2010 | Uozumi | | B29C 53/602 |
| | | | | 242/438 |
| 7,934,530 B2 * | 5/2011 | Uozumi | | B29C 53/64 |
| | | | | 156/425 |
| 8,079,205 B2 * | 12/2011 | Nava | | B65H 81/08 |
| | | | | 57/13 |
| 8,147,937 B2 * | 4/2012 | Brisson | | B29C 53/665 |
| | | | | 428/34.1 |
| 8,484,841 B1 * | 7/2013 | Burros | | D07B 1/147 |
| | | | | 29/825 |
| 8,677,619 B2 * | 3/2014 | Dye | | H01B 13/0214 |
| | | | | 29/33 M |
| 8,980,033 B2 * | 3/2015 | Tanigawa | | B29C 63/08 |
| | | | | 156/160 |
| 9,061,466 B2 * | 6/2015 | Roche | | B29C 53/8016 |
| 9,303,355 B2 * | 4/2016 | Willson | | D07B 7/06 |
| 2002/0026781 A1 * | 3/2002 | Shigeyama | | D01H 1/115 |
| | | | | 57/12 |
| 2003/0051795 A1 * | 3/2003 | Burgess | | B29C 53/68 |
| | | | | 156/169 |
| 2006/0107644 A1 * | 5/2006 | Dye | | A61N 1/05 |
| | | | | 57/13 |
| 2007/0125488 A1 * | 6/2007 | Brisson | | B29C 53/665 |
| | | | | 156/184 |
| 2015/0152596 A1 * | 6/2015 | Lauer | | D07B 7/02 |
| | | | | 57/6 |
| 2017/0044657 A1 * | 2/2017 | Mastronardi | | B29C 70/388 |

OTHER PUBLICATIONS

Written Opinion dated Feb. 4 2015 issued in corresponding International patent application No. PCT/FR2014/051192.

* cited by examiner

GUIDE WHEEL FOR ASSEMBLIES FOR FITTING LAYERS OF ARMORING WIRES

CROSS-REFERENCE TO RELATED APPLICATIONS

The present application is a 35 U.S.C. §§ 371 national phase conversion of PCT/FR2014/051792, filed Jul. 11. 2014, which claims priority of French Patent Application No. 1356825, filed Jul. 11, 2013, the content of which are incorporated by reference herein. The PCT International Application was published in the French language.

TECHNICAL FIELD OF THE INVENTION

This invention relates to a tool intended for machines for laying armor filaments around a tubular core to manufacture a flexible tubular pipe suitable for the transport of hydrocarbons.

In particular the tool to which the invention relates can be used to lay carbon armor filaments.

BACKGROUND OF THE INVENTION

The concept of a flexible tubular pipe including a layer of reinforcement comprising carbon filaments is already known. Reference may be made to document FR2776358 describing such a tubular pipe. The carbon filaments or carbon composite sections in effect have excellent mechanical properties in tension, substantially twice that of steel wires and in addition to this they are comparatively very much lighter. As off-shore oil production is taking place at increasingly greater depths, for example beyond 3000 m, the total weight of the flexible tubular pipe becomes increasingly greater, and because of this the means for supporting it, essentially buoys, become increasingly larger and more costly.

In the case of conventional flexible tubular pipes most steel armor wires are wound helically and simultaneously with a long pitch around a tubular core to produce a layer of armor wires. These wires are flat and are inclined at an angle of for example between 20° and 60° to the axis of the flexible pipe. From 40 to 90 wires for example can thus be wound simultaneously around the tubular core. The latter comprises a leaktight sheath made of polymer material and a layer of armor wire wound around the leaktight sheath with a short pitch so that the pipe can withstand the radial pressure exerted by the petroleum fluid transported. In addition to this a second layer of armor wires is wound around the first layer in the opposite direction.

The armor wires are fitted by means of an assembly comprising a supporting wheel which has a central recess to allow the tubular core to pass through the said wheel. The latter includes bobbins storing a plurality of armor wires and a plurality of guide assemblies mounted around the said central recess. The tubular core and the wheel are then drawn along simultaneously, the tubular core through the central recess and the wheel rotating around the tubular core so as to wind the armor wires on the cores helically with a long pitch, while each of the said armor wires is drawn in translation through the guide assemblies. The armor wires thus extend between the guide assemblies and the tubular core respectively, causing the armor wire to flex. Reference will be made to document WO2010/012897 which describes such a conventional machine.

SUMMARY OF THE INVENTION

Of course it was envisaged that layers of carbon armor filament could be produced using a conventional machine of a type described above. However, despite the possibilities for adjustment offered by such a machine, carbon armor filaments do not fit correctly onto the tubular core and in addition to this carbon filaments tend to break when the winding speed increases.

Again, a problem which arises and which this invention is intended to overcome is to provide a guide wheel which makes it possible to lay a layer of carbon armor filament at sufficient speeds not to have an adverse effect on manufacturing cost and without damaging the armor filaments.

With this in view, and in accordance with a first object, this invention provides a guide wheel intended for laying a layer of carbon armor filament around a tubular core to manufacture a flexible tubular pipe which is suitable for the transport of hydrocarbons, the said guide wheel having a central recess and an internal circular edge bounding the said central recess as well as a peripheral circular edge extending coaxially at a distance from the said circular inner edge, the said guide wheel having a plurality of guide assemblies capable of guiding a plurality of carbon armor filaments in translation respectively passing across the said peripheral circular edge, the guide assemblies being mounted around the said central recess to guide the carbon armor filaments when the said tubular core is driven in translation through the said central recess, while the said guide wheel is driven in rotation so that it can simultaneously helically wind the said carbon armor filaments around the said tubular core. In accordance with the invention each of the said guide assemblies comprises a peripheral return member mounted in the said peripheral circular edge to guide the carbon armor filaments towards the said inner circular edge through a first curved passageway together with a central return member mounted in the said inner circular edge to guide the said carbon armor filaments from a second oppositely curved passageway in the said wheel.

Thus one characteristic of the invention lies in providing a guide assembly which extends at least partly from the peripheral circular edge of the guide wheel towards the tubular core defining an overall doubly curved S-shaped passageway. In this way the armor filament is drawn in translation along this overall S-shaped passageway before being applied flat to the core, as happens when a strip or tape is wound around layers of armor. It is thus perfectly guided and at least partly protected by means of the passageway. As a consequence the carbon armor filaments remain free between the guide wheel and the core over a shorter distance than assemblies as claimed in the prior art allowed. As will be explained in greater detail in the remainder of the description the curvatures imposed on the carbon armor filaments along the doubly curved passageway are obviously very much less than their elastic limit.

In accordance with a particularly advantageous embodiment of the invention the said peripheral return member and the said central return member are connected together by a straight guide member. This characteristic makes it possible to provide the guide assembly with greater rigidity and to give the carbon armor filaments even more protection when they pass through the S-shaped passageway.

Furthermore, in accordance with one preferred characteristic, the said straight guide member is telescopically adjustable. As a result the distance between the peripheral return member and the central return member can be easily adjusted, partly to better adjust to different lay diameters and partly to adjust the carbon armor filaments on the tubular core as will be explained in greater detail in the remainder of the description.

In addition to this the said peripheral return member and the said central return member can advantageously be adjusted in rotation with respect to each other along the axis of the said straight guide member. Thus because of this possibility carbon armor filaments can be substantially twisted between the two return members and because of this the plane defined by the second curved passageway is inclined in relation to the plane defined by the first curved passageway. This characteristic also allows for better adjustment of the application of carbon armor filaments onto the tubular core, and in particular the angle at which the armor filaments are laid in relation to the tubular member.

In addition to this, each of these guide assemblies comprises an attachment plate which is pivotally mounted on the said central return member and a member for adjusting the relative position of the said central return member and the said attachment plate. As a result of this it is easier to maintain the angular position of the central return member in relation to the peripheral return member.

With regard to the peripheral return member this preferably comprises an upstream guide member intended to be fixed across the said peripheral circular edge. This upstream guide member, also known as a feeder head has a right cross-section corresponding to the cross-section of the carbon armor filament and allows the filament to slide. Preferably the said upstream guide member comprises a tubular guide end member mounted so that it can rotate, the said tubular guide end member having an inlet slot. As a result of this the tubular guide end member adjusts to the orientation of the filament when it enters the upstream guide member.

In addition the said central guide member comprises a downstream guide member, the said downstream guide member comprising a downstream tubular guide part mounted so that it can rotate. Thus as the orientation of the armor filament between the central return member and the tubular core is defined by the relative orientation of the guide assembly but also by substantial heterogeneities in the shape of the surface of the core, tension in the filament in the direction of twisting is balanced by the downstream guide member.

Furthermore the said peripheral return member and the said central return member in each of the said guide assemblies are adjusted as an extension of each other along a chord of the said wheel, and more specifically along a chord of the circle defined by the said guide wheel. As will be explained in greater detail later in the description, this characteristic makes it possible to increase the angle between the armor filaments and the tubular core in relation to the number of filaments and also in relation to the geometry of the filaments.

In accordance with another object this invention relates to a method for mounting an assembly for laying a layer of carbon armor filaments around a tubular core to manufacture a flexible tubular pipe intended for the transport of hydrocarbons, the said method being of the type as claimed in which there is provided a machine comprising at least one supporting wheel having a central passageway to allow a tubular core to pass through the said at least one supporting wheel, the said at least one supporting wheel comprising storage means capable of storing a plurality of carbon armor filaments so that the said carbon armor filaments can be driven in rotation around the said tubular core, while the said tubular core is driven in movement through the said at least one supporting wheel to helically wind the said carbon armor filaments onto the said core. In accordance with the invention the guide wheel as claimed in the above characteristics is also provided and the said guide wheel is coaxially mounted on the said at least one supporting wheel. The carbon armor filaments are helically wound with a long pitch. Preferably the machine comprises two successive supporting wheels driven in opposite directions making it possible to provide two layers of crossed armor filaments. Also two guide wheels as claimed in the invention are provided and the two guide wheels are respectively mounted on the supporting wheels.

Furthermore, as claimed in a particularly advantageous characteristic of the invention, an assembly frame comprising locking means so that the said guide wheel can be mounted and locked on the said assembly frame is provided. In this way the wheel can be easily transported without risk of becoming damaged. Preferably the assembly frame is designed to be able to mount two guide wheels back to back, so that two supporting wheels of a machine can be fitted respectively.

Also, in accordance with a variant embodiment, the said assembly frame comprises motor drive means to drive the said guide wheel. The motor drive 85 more specifically makes it possible to drive the wheel in rotation on the assembly frame so that the guide assemblies can be installed one by one as will be explained below.

Also, advantageously, the stage of fitting the said guide wheel comprises the following stages: the said assembly frame is placed in the vicinity of the said machine; the said locking members are locked; the said guide assemblies are fitted; the said guide assemblies are adjusted; raised supports are fitted on the said at least one supporting wheel and the said guide wheel is placed on the said at least one supporting wheel to attach it by means of the said raised supports. Of course when the machine comprises two supporting wheels, raised supports are fitted to the two supporting wheels and two guide wheels are respectively mounted on the supporting wheels to attach them by means of the raised supports.

BRIEF DESCRIPTION OF THE DRAWINGS

Other features and advantages of the invention will be apparent from a reading of the following description of a particular embodiment of the invention provided indicatively but without limitation with reference to the appended drawings, in which.

DETAILED DESCRIPTION OF THE EMBODIMENTS

Figure 1:
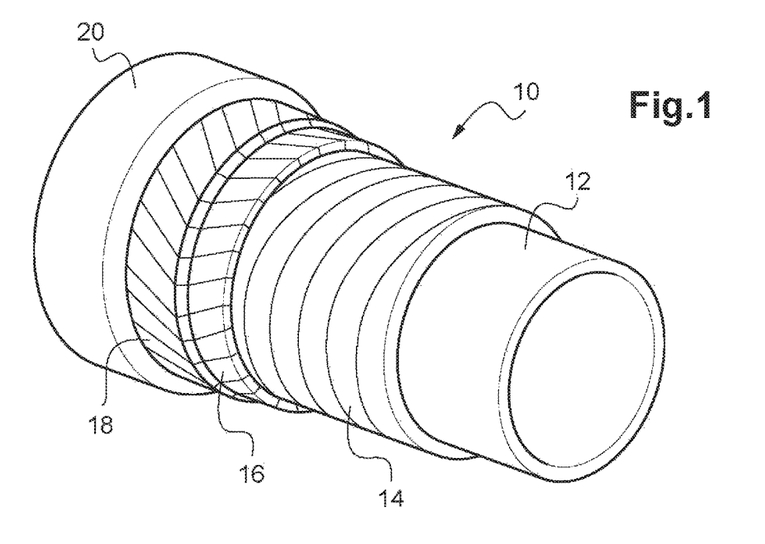
FIG. 1 is a diagrammatical stripped view of a flexible tubular pipe made in accordance with the object of the invention.

FIG. 1 illustrates a flexible tubular pipe 10 especially intended for the transport of hydrocarbons across the seabed. From the inside to the outside it comprises an internal leaktight pressure sheath 12, within which the hydrocarbons flow; a layer of armor filaments 14 wound with a short pitch, typically with a helical angle of between 70° and 90° in relation to the central axis of flexible tubular pipe 10 around pressure sheath 12 which take up the internal pressure forces together with inner sheath 12; two layers of tensile armor filaments 16, 18 wound with a long pitch with an armor angle of between 20° and 60° in relation to the central axis of flexible tubular pipe 10 so as to take up longitudinal tensile forces. Specifically these two layers 16, 18 are made by winding carbon filaments such as are described in document FR2776358. These two layers 16, 18 are here covered with an outer protective sheath 20. Preferably a metal carcass made by winding a profiled sheet with a short pitch with an armor angle of between 70° and 90° in relation to the central axis of pipe 10 may be placed within internal leaktight pressure sheath 12.

Figure 2:
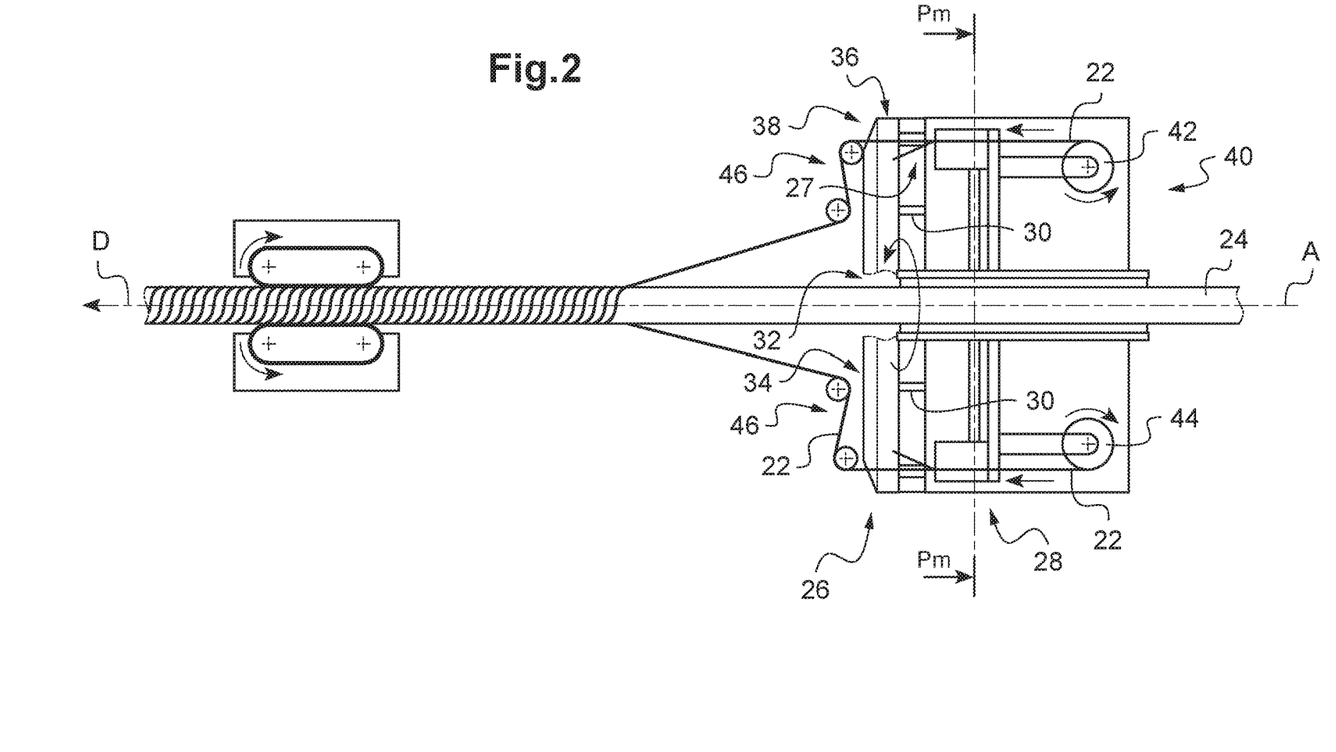
FIG. 2 is a diagrammatical view in axial cross-section of a machine for the manufacture of a flexible tubular pipe comprising a guide wheel as claimed in the invention.

With reference to FIG. 2 we will describe a machine for laying a layer of carbon armor wire 22 around a tubular core 24 which has only inner sheath 12 and layer of armor filaments 14 wound with a short pitch with touching turns. The winding machine described here uses the elements of an existing winding machine intended to produce layers of armor wires, to which has been attached a guide wheel 26 so that carbon fiber armor filaments can be used.

The machine comprises a supporting wheel 28 designed to be driven in rotation about its axis of symmetry A, which is the same as the axis of symmetry of tubular core 24. Guide wheel 26 is then mounted coaxially on the front surface 27 of supporting wheel 28 by means of struts 30 or raised supports. Struts 30 makes it possible to clear the length of the preforming heads which remain in place on the armoring head. After being fitted to supporting wheel 28 struts 30 can remain there without interference in the absence of guide wheel 26 when the winding machine is used for the purpose of laying steel armor wires. Struts 30 are attached to the supporting wheel by means of a plurality of attachment bolts. The guide wheel is itself attached to struts 30 through several electromechanical pistons associated with tightening components.

Guide wheel 26 has a central recess 32 and an inner circular edge 34 which extends around central recess 32. It also has a peripheral edge 36 and a peripheral circular edge 38.

Supporting wheel 28 has a rear surface 40 opposite front surface 27 in which bobbins 42, 44 of carbon armor filaments are respectively installed. Only two bobbins are shown in the axial cross-section in FIG. 2. Supporting wheel 28 is provided with a plurality of bobbins distributed along the rear peripheral edge of supporting wheel 28. In a particular embodiment supporting wheel 28 is fitted with 62 bobbins for carbon armor filament.

Thus bobbins 42, 44 are capable of delivering armor filaments 22 which pass through supporting wheel 28 at its peripheral edge to emerge respectively from peripheral border 38 of guide wheel 26. Armor filaments 22 then pass through guide assemblies 46 fitted on guide wheel 26 which provide an S-shaped passageway for the carbon armor filaments. Guide assemblies 46 will be described more particularly with reference to FIGS. 3 to 5.

Figures 3, 4, 5:
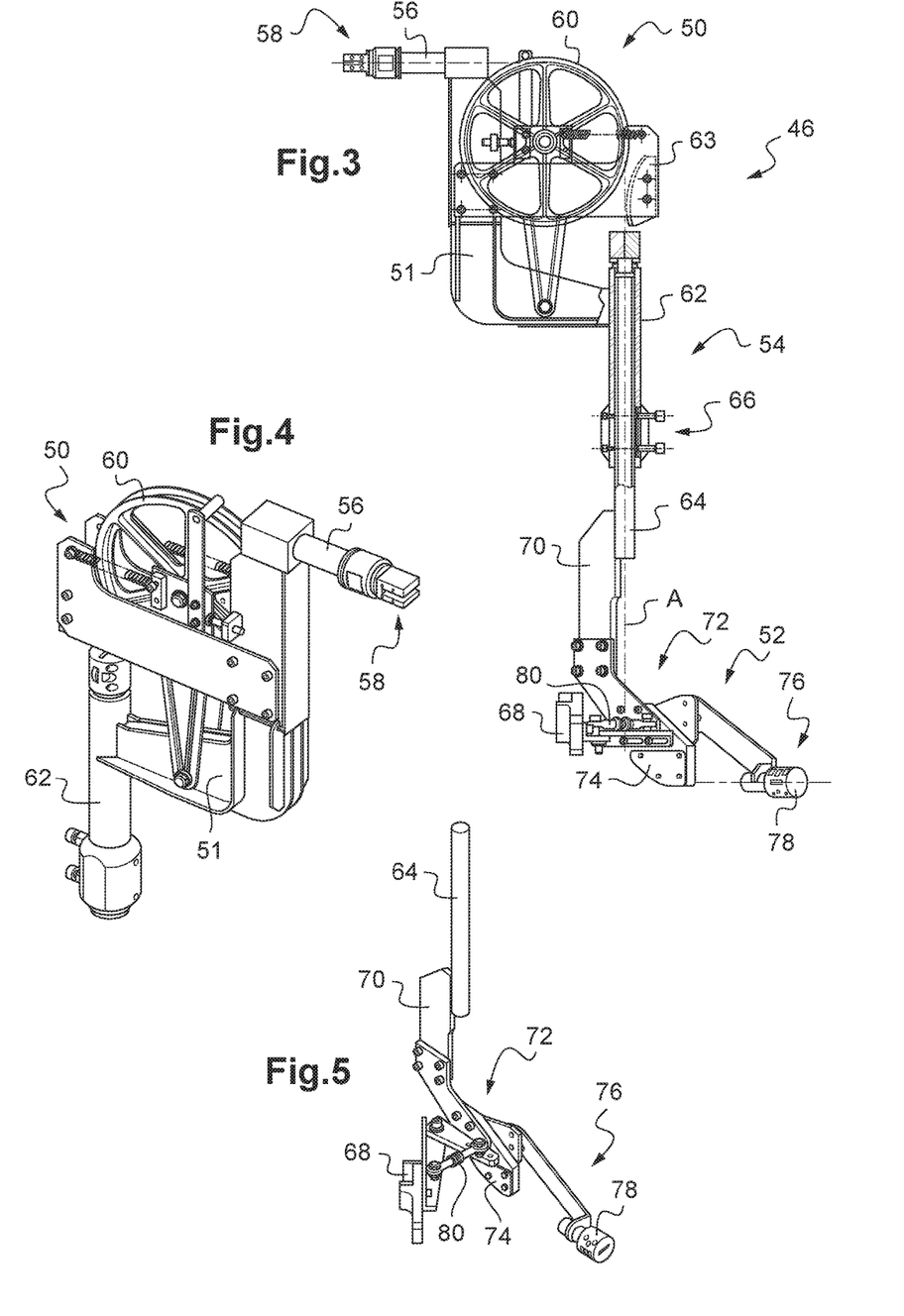
FIG. 3 is a diagrammatical view from the side of a detailed element of the guide wheel as claimed in the invention.
FIG. 4 is a diagrammatical perspective view of a first part of the detailed element illustrated in FIG. 3.
FIG. 5 is a diagrammatical perspective view of a second part of the detailed element illustrated in FIG. 3.

FIG. 3 is an overall view of guide assembly 46. This comprises a peripheral return member 50 opposite a central return member 52 and a telescopic straight adjustment member 54 which forms a straight guiding member connecting the two return members 50, 52. Peripheral return member 50 has an L-shaped framework 51 and an upstream tubular member 56 connected to one extremity of frame 51 which is substantially perpendicular to the largest limb of that frame. At the entrance to upstream tubular member 56, or upstream guide member, an inlet end member 58, or tubular guide end member, is mounted centered and free to rotate. Inlet end member 58, also known as a feeder head is intended to assist transverse guiding of the carbon armor filament. Also as the carbon filament is a tape of rectangular cross-section, inlet end member 58 has a slot bounded by guide bearings, which are not shown. In one variant the armor filament has a substantially circular cross-section.

Peripheral return member 50 also comprises a guide pulley 60, or peripheral roller fairlead, having a radius which is preferably between 300 mm and 400 mm, for example 350 mm. It is arranged in relation to upstream tubular member 56 in such a way that the direction of the latter corresponds to a tangent to guide pulley 60. Peripheral return member 50 comprises an adjustment sleeve 62 which is of one piece with the end of the small limb of frame 51 and orientated in the extension of another tangent to guide pulley 60. In addition to this peripheral return member 50 is provided with a brake shoe 63 which makes it possible to hold the carbon armor filament if it should break while it is being laid.

FIG. 4 shows in perspective an L-shaped framework 51 illustrating upstream tubular member 56 and adjustment sleeve 62 orientated substantially perpendicular to each other and between them guide pulley 60. It will thus be understood that a carbon armor filament could be threaded through inlet end member 58 to be supported on guide pulley 60 and then make use of adjustment sleeve 62 forming a first curved passageway. Thanks to guide pulley 60 the carbon armor filament may be drawn through peripheral return member 50 at high speed without being damaged.

Reference will now be made again to FIG. 3 which shows guide assembly 46 as a whole. Within adjustment sleeve 62 there is inserted a connecting tube 64 to form straight telescopic adjustment member 54. Adjustment sleeve 62 is provided with a tightening ring 66 which immobilizes the movements of connecting tube 64 in relation to adjustment sleeve 62, in either rotation or translation.

Central return member 52 comprises a connecting plate 70 which is of one piece with connecting tube 64 and extends longitudinally leaving the internal space of the connecting tube unobstructed. Connecting plate 70 is then connected to a central arm 72 comprising a central roller fairlead 74, here comprising a portion of a disc, and a downstream guide member 76. The latter comprises an outlet end member 78, or tubular downstream guide member, or again outlet feeder head having a cross-section similar to that of inlet end member 58 of peripheral return member 50. It is also mounted so that it can rotate on downstream guide member 76. Downstream guide member 76 keeps outlet end member 78 in an extension of a tangent to central roller fairlead 74. Furthermore axis B of connecting tube 64 also extends along a tangent to central roller fairlead 74.

In addition to this, guide assembly 46 comprises a fixing plate 68 pivotally mounted on central arm 72 about an axis which is substantially parallel and close to the axis B of connecting tube 64. Attachment plate 68 is also connected to central arm 72 at central roller fairlead 74 through an adjusting connecting rod 80. This adjusting connecting rod 80 makes it possible to hold attachment plate 68 and central arm 72 away from each other through an angle which for example comprises between 25° and 80°.

The perspective view in FIG. 5 shows central return member 52 and in particular attachment plate 68 and central arm 72 connected together by means of adjusting connecting rod 80. Bearing FIG. 3 in mind it will be understood that the carbon armor filament which extends within adjustment sleeve 62 will continue its travel within connecting tube 64 until it is supported on central roller fairlead 74 and reaches outlet end member 78 following a second curved passageway. Outlet end member 78 which is mounted so that it can rotate is able to correct the last angular variation in the carbon armor filament before it is deposited onto tubular core 24.

As the result of tightening ring 66 the relative distance between the two return members 50, 52 can be adjusted by sliding connecting tube 64 within sleeve 62. In addition to this connecting tube 64 can be driven in rotation within sleeve 62 and thus the relative angular position of the two return members 50, 52 can also be adjusted. Thus it will be understood that a torsional movement can be applied to the armor filament about its central core between guide pulley 60 and central roller fairlead 74.

With regard to attachment plate 68, which is mounted in a fixed position on inner circular edge 34 of guide wheel 26 as will be explained below, the relative angular position of central arm 72 can be adjusted using adjusting connecting rod 80. This relative angular position directly governs the torsional movement imposed on the armor filament.

Figures 6, 7:
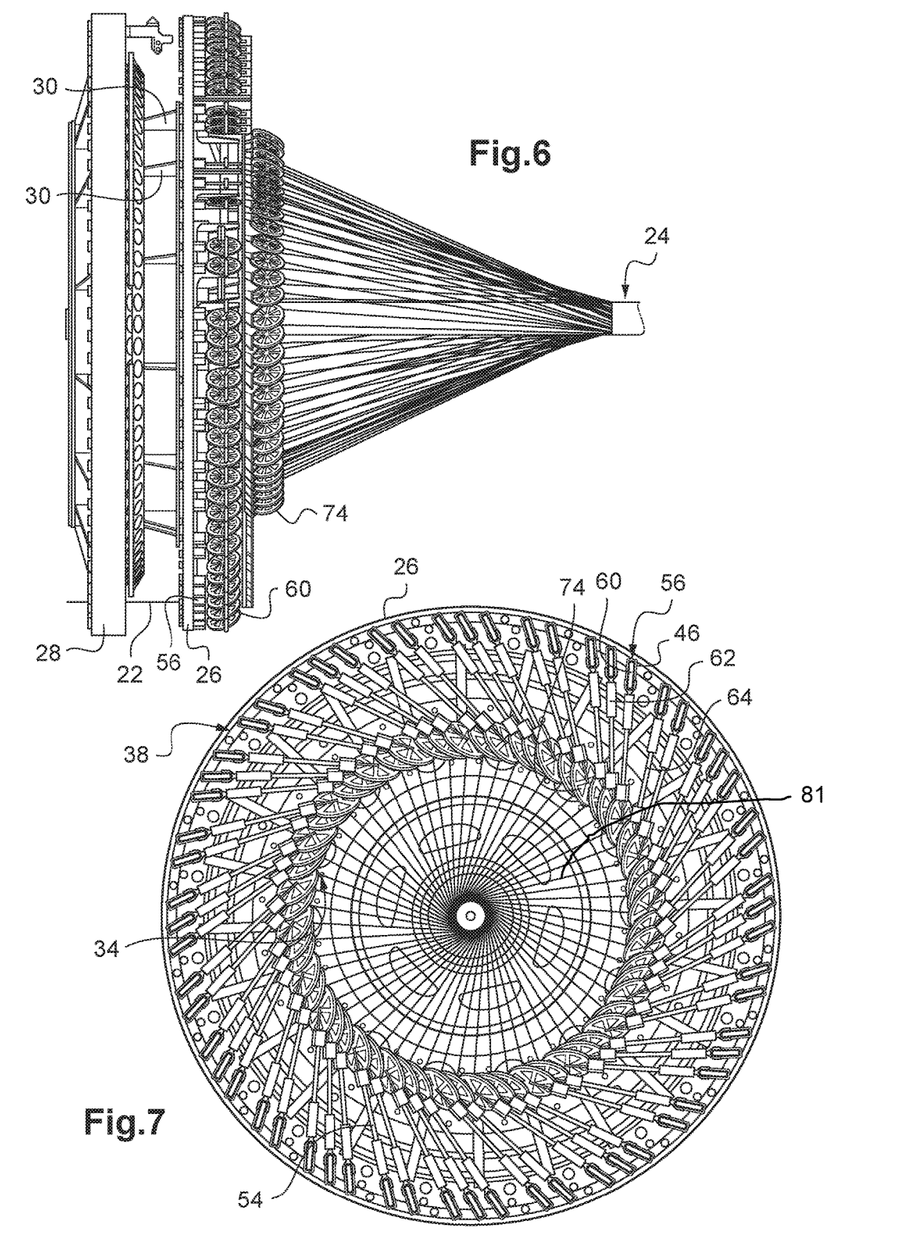
FIG. 6 is a diagrammatical view from the side showing the guide being mounted on the machine in accordance with the invention.
FIG. 7 is a diagrammatical front view showing the guide wheel illustrated in FIG. 6.

Reference will now be made to FIGS. 6 and 7, which illustrate guide wheel 26 mounted on supporting wheel 28 in detail. FIG. 7 provides a front view of guide wheel 26 fitted with a plurality of guide assemblies 46, in the case in point up to 80, distributed over the entire wheel. Inner circular edge 34 and peripheral circular edge 38 will be seen.

Each of guide assemblies 46 is mounted in this way, upstream tubular member 56 through peripheral circular edge 38, substantially perpendicularly to the mean plane defined by guide wheel 26 and attachment plate 68 provided with a clamp on inner circular edge 34 so that straight telescopic adjustment member 54 is orientated along a chord 81 of the circle defined by guide wheel 26 at an angle of for example between 20° and 45°. In accordance with the embodiment illustrated in FIGS. 6 and 7 central roller fairlead 74 is a pulley, just like guide pulley 60. Also, whereas guide pulley 60 extends along a plane which is substantially perpendicular to the mean plane defined by guide wheel 26, corresponding here to the plane in FIG. 7, the plane defined by central roller fairlead 74 comprises a pulley forming an angle of approximately 20° with the mean plane of guide wheel 26.

Thus, first considering FIG. 6 and then FIG. 7 and then returning to FIG. 6, a carbon armor filament 22 passing through supporting wheel 28 and peripheral edge 38 of guide wheel 26 substantially perpendicularly to the mean plane defined by that wheel engages in upstream tubular member 56 to be then delivered towards inner circular edge 34 by means of guide pulley 60 and straight telescopic adjusting member 54 extending the same, substantially parallel to the mean plane of guide wheel 26 and along a chord of a circle defined by that same wheel. Then central roller fairlead 74 in turn returns armor filament 22 towards tubular core 24 opposite guide wheel 26. The armor filament then extends freely between outlet end member 78 of downstream guide member 76 and tubular core 24 at an angle of close to 30° to the latter.

The relative positions of the different members have been described from a static point of view. Considering the winding machine illustrated in FIG. 2, tubular core 24 is driven in translation along its own direction A, orientated by supporting wheel 28 towards guide wheel 26, while at the same time supporting wheel 28 and guide wheel 26 with which it forms an integral part are driven in rotation around tubular core 24. Thus in the case in point up to 80 carbon armor filaments 22 are simultaneously driven through guide wheel 26 and corresponding guide assemblies 46 to be helically wound with a long pitch around tubular core 24.

Each of the carbon armor filaments thus follow an S-shaped passageway on the front side of guide wheel 26 making it possible to preserve their mechanical properties and apply them to the tubular core in the same way as a polymer tape.

In accordance with another object the invention also relates to a method of mounting an assembly for laying a layer of carbon armor filament around a tubular core to manufacture a flexible tubular pipe intended for the transport of hydrocarbons. To do this we start from an existing machine which can produce layers of steel armor wire on tubular cores. This machine comprises two coaxial supporting wheels located at a distance from each other and forming the armor heads. Thus two guide wheels as claimed in the invention are provided to fit out the two aforesaid supporting wheels respectively.

Figure 8:
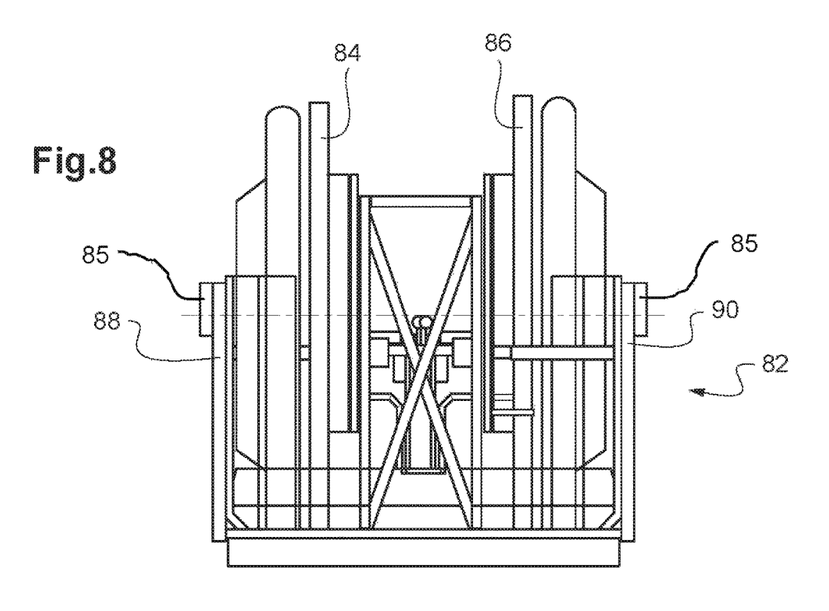
FIG. 8 is a diagrammatical view of a mounting support for guide wheels as claimed in the invention.

In order to rationalize the preparation of machines an assembly frame 82 as shown in FIG. 8 is provided. This three-part assembly frame 82 which can support two guide wheels 84, 86 back to back is illustrated diagrammatically in FIG. 8. The assembly frame has two opposite side surfaces which keep the two guide wheels 84, 86 in a fixed position in assembly frame 82 as a result of locking means 88, 90.

Thus during a first stage of assembly, frame 82 is delivered from a storage area to a preparation area located close to the manufacturing facility. In a second installation stage the locking members 88, 90 are unlocked so that the side surfaces of frame 82 can be unlocked so that the guide assemblies can be installed on guide wheels 84, 86. Assembly frame 82 is equipped with motor drives 85 which will drive the guide wheels in rotation on frame 82 in such a way that the guide assemblies can be installed on guide wheels 84, 86 one by one. In a third stage both the inclination of the guide assemblies in relation to the radii of the wheel and the angle with which the carbon armor filaments are laid are adjusted. The raised supports, which will be permanently fixed, are then installed on the front surface of the supporting wheels of the machine, and then the guide wheels are respectively placed on the supporting wheels to immobilize them there coaxially by means of the raised supports.

Figure 9:
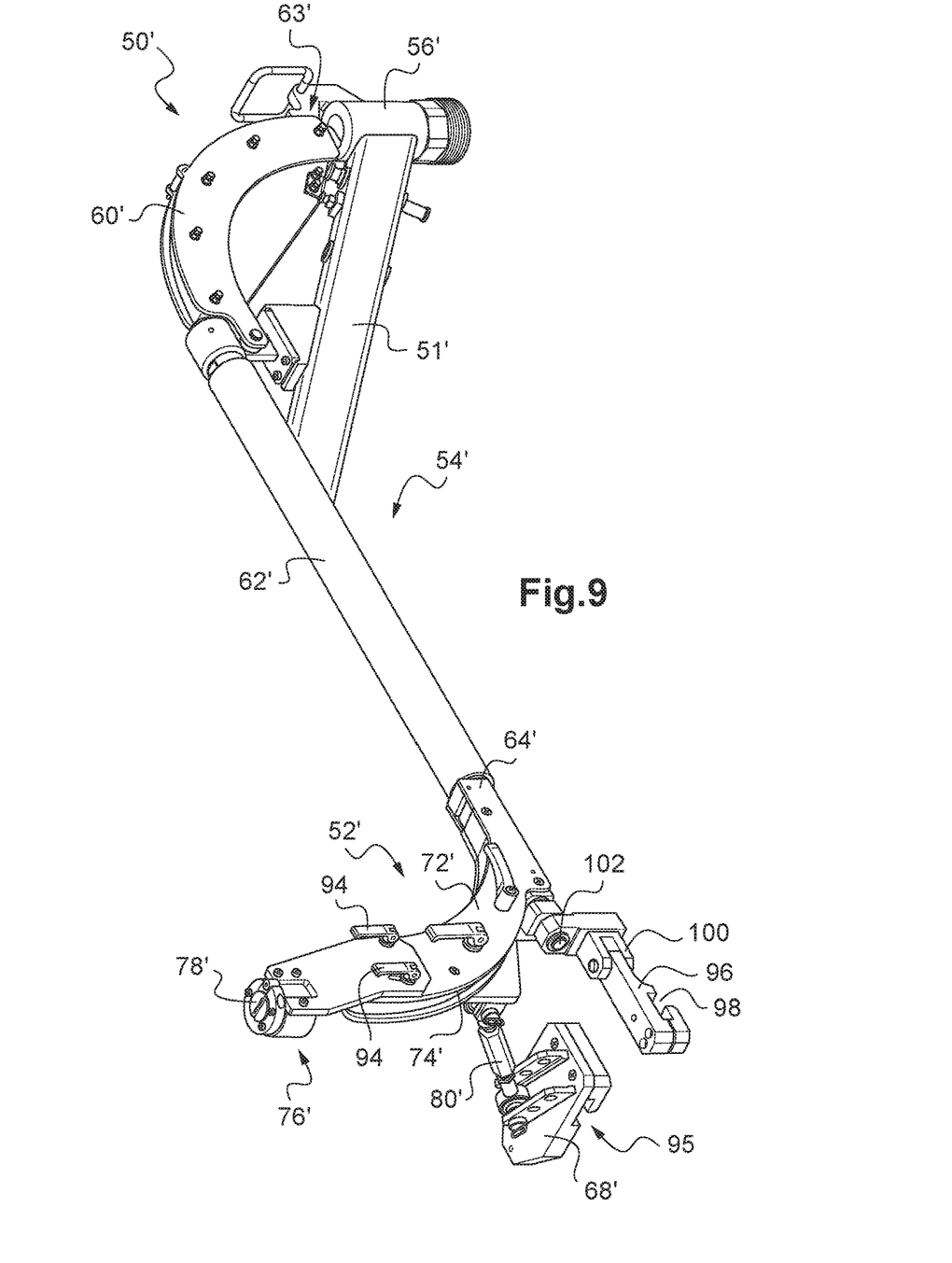
FIG. 9 is a diagrammatical perspective view of a detailed element of the guide wheel illustrated in FIG. 2, in a variant embodiment.

FIG. 9 illustrates another embodiment of a guide assembly. In addition to this, components which are common to the embodiment illustrated in FIGS. 3-5, or which play the same part, will have the same reference number bearing an apostrophe "'".

The guide assembly comprises a peripheral return member 50' opposite a central return member 52' and straight telescopic adjusting member 54' connecting the two return members 50', 52'. Straight telescopic adjusting member 54' comprises a main tube 62'.

Peripheral return member 50' has an upstream tubular part 56' capable of receiving an inlet end member not shown in FIG. 9 and a transverse framework 51' which is used to rigidly connect together upstream tubular member 56' and main tube 62' which extend substantially perpendicular to each other.

Peripheral return member 50' comprises an upper roller fairlead 60' extending in an arc of a circle between upstream tubular member 56' and main tube 62'. Its radius of curvature is preferably between 300 mm and 400 mm. In addition to this it is partly supported by transverse framework 51'.

Peripheral return member 50' is also provided with a brake shoe 63', or radiaflex stop located on upper roller fairlead 60' close to upstream tubular member 56' which makes it possible to hold the carbon armor filament.

Thus a carbon armor filament may be threaded through upstream tubular member 56' to be supported on upper roller fairlead 60' and then directly use main tube 62' forming a first curved pathway. The carbon armor filament can then be drawn at high speed and guided over upper roller fairlead 60'.

Central return member 52' comprises a central arm 72' directly attached to main tube 62' by means of a connecting tube 64' coaxially sleeved within main tube 62'. Connecting tube 64' is mounted so that it is free in rotation and translation within main tube 62'.

In the prolongation of connecting tube 64', central arm 72' comprises a central roller fairlead 74' and an adjustable downstream guide member 76' which is itself mounted in a prolongation of central roller fairlead 74'. Downstream guide member 76' comprises both an outlet end member 78', or outlet feeder head and eccentric locking levers 94. Thus adjustable downstream guide member 76' is pivotally mounted on central arm 72' in a plane defined by central roller fairlead 74' and is capable of having its pivoting moment blocked by means of eccentric locking levers 94.

Outlet end member 78' is mounted so as to rotate on downstream guide member 76'. Downstream guide member 76' holds outlet end member 78' in a prolongation of a first tangent to central roller fairlead 74. In addition to this main tube 62' and connecting tube 64' extend along a second tangent to central roller fairlead 74' which is substantially perpendicular to the former.

Also the guide assembly comprises a first attachment plate 68' connected to central arm 72' at the side of central roller fairlead 74' through an adjusting connecting rod 80'. The latter is pivotally mounted on central arm 72' around an axis which is substantially parallel and close to the axis of connecting tube 64'. It is also pivotally mounted on first attachment plate 68'. Adjusting connecting rod 80' makes it possible to hold first attachment plate 68' and central arm 72' away from each other through an angle of for example between 30° and 80° as will be explained below. It also has first clamps 95.

The guide device illustrated in FIG. 9 also comprises a second attachment plate 96 having second clamps 98. This second attachment plate 96 is pivotally mounted in a clevis 100. The latter has a return which is itself pivotally mounted on a pivot pin 102 at the end of connecting tube 64' along the axis of main tube 62'.

Thus the carbon armor filament which extends longitudinally within main tube 62' and connecting tube 64' continues its travel until it is supported on central roller fairlead 74' and reaches outlet end member 78' following a second curved passageway. Outlet end member 78' which is rotationally mounted makes it possible to correct the last angular deviations in the carbon armor filament before it is laid onto tubular core 24.

Connecting tube 64' is rotationally mounted at the end of main tube 62' and thus the relative angular position between the two return members 50', 52' can be adjusted. Thus a torsional movement can be applied to the armor filament about its central core between upper roller fairlead 60' and central roller fairlead 74'.

Figure 10:
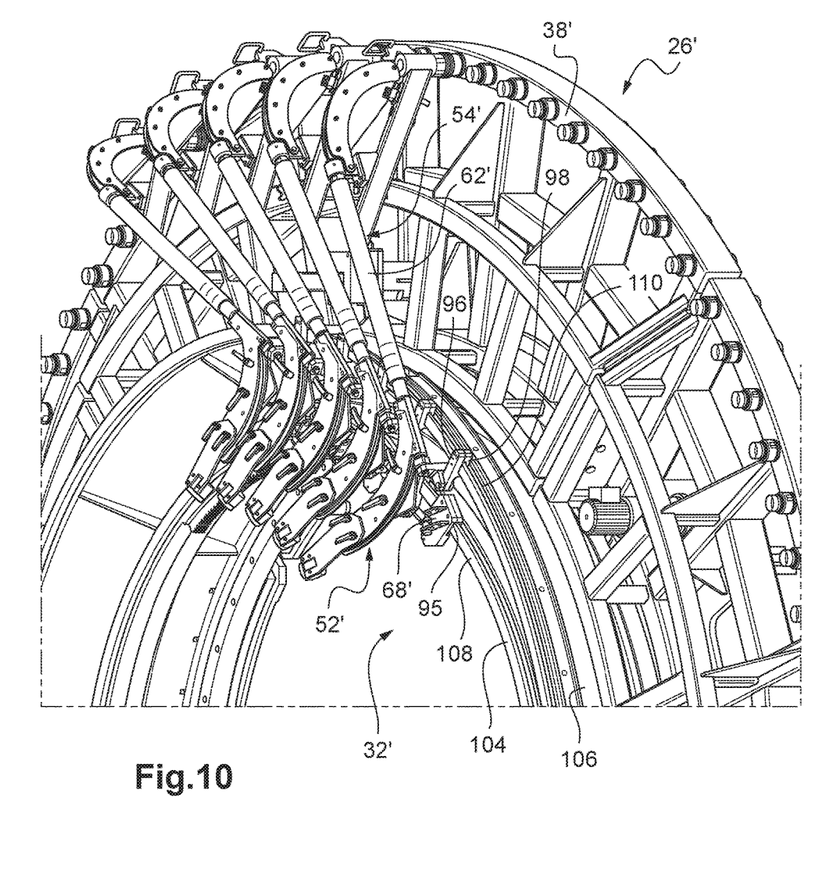
FIG. 10 is a partial perspective diagrammatical view of the guide wheel fitted with the detailed elements as claimed in the variant embodiment illustrated in FIGS. 9.

Reference will now be made to FIG. 10 which partly illustrates a guide wheel 26' in accordance with an embodiment which is capable of receiving guide assemblies as claimed in the said other embodiment.

Thus guide wheel 26' has a central recess 32' and two concentric rings mounted one within the other within central recess 32', a first inner one 104 and a second outer one 106. Thus the two rings respectively define an inner circular edge 108 and an outer circular edge 110. Second outer ring 106 is rotationally mounted within guide wheel 26', while first inner ring 104 is rotationally mounted within second outer ring 106. The guide wheel also has a peripheral circular edge 38'.

Reference will now be made to a single guide assembly, although guide wheel 26', which is partly illustrated, only bears five for reasons of clarity in the drawing.

Thus second attachment plate 96 is mounted in a fixed position in outer circular edge 110 by means of second clamp 98, while first attachment plate 68' is mounted in a fixed position in inner circular edge 108 through first clamp 95. The same applies to all the guide assemblies mounted on guide wheel 26'.

In this way, when straight telescopic adjusting members 54' have to be orientated in a plane which is substantially parallel to the mean plane defined by guide wheel 26', the two rings 104, 106, which are of one piece with each other, are caused to rotate within guide wheel 26'. In this way connecting tubes 64' are simultaneously drawn in translation in relation to the inside of their main tube 62' as straight telescopic adjusting members 54' become orientated.

When it is a question of angularly orientating central return members 52' in relation to peripheral return members 50', outer ring 106 is held in a fixed position in relation to guide wheel 26' while inner ring 104 is driven in rotation in relation to outer ring 106. In this way the relative movement between first attachment plates 68' respectively in relation to their central arm 72' causes central arm 72' to pivot as a result of adjusting connecting rod 80'.

In this way the carbon armor filaments are simultaneously drawn through guide wheel 26' and the corresponding guide assemblies, and can be adjusted simultaneously and by the same amount as a result of rings 104, 106 before starting to be wound helically with a long pitch around tubular core 24.

Figure 11:
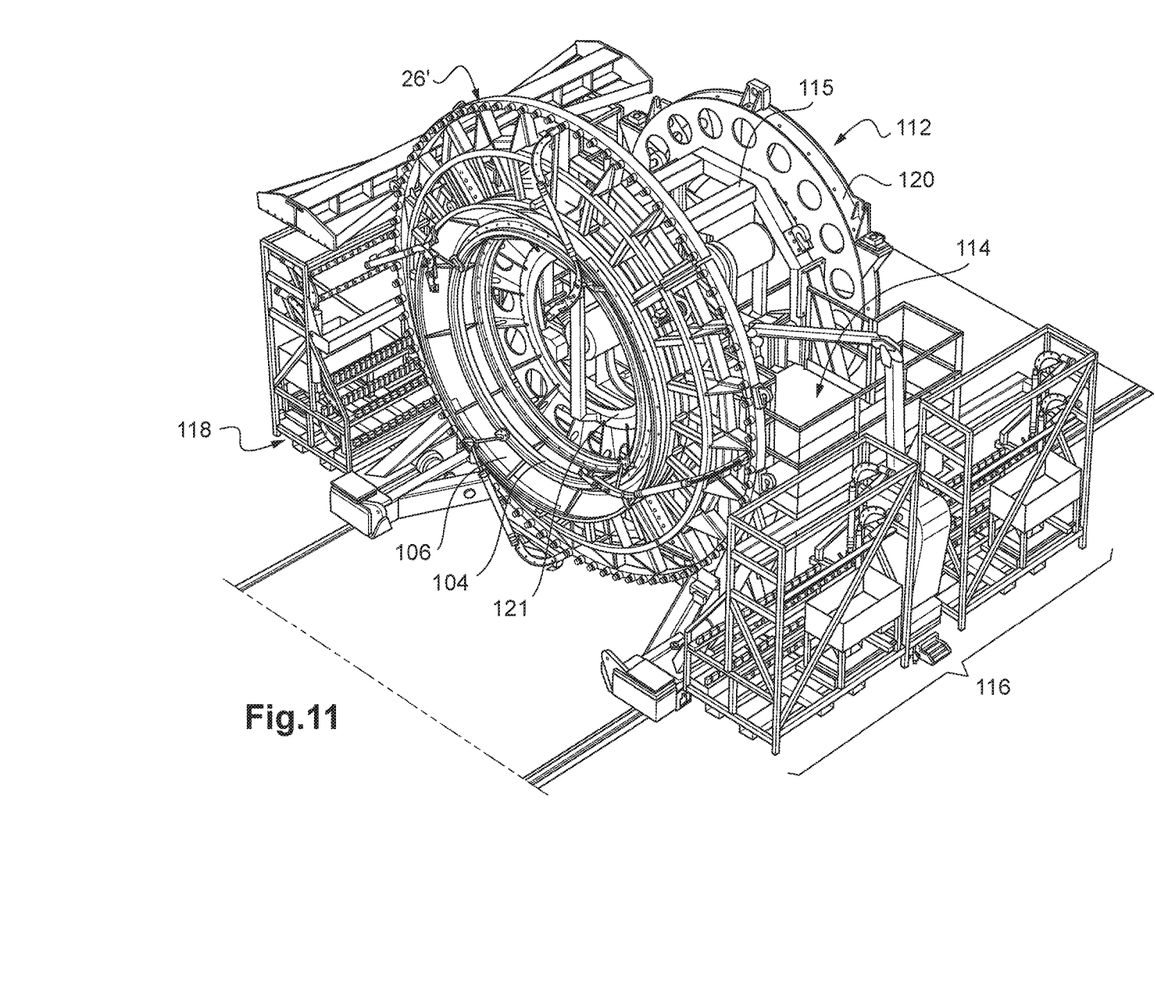
FIG. 11 is a diagrammatical perspective view of the mounting support for guide wheels illustrated in FIG. 8 fitted with the detailed elements shown, in accordance with a variant embodiment.

FIG. 11 illustrates a mounting support for guide wheels 26' in accordance with a variant embodiment. The said mounting support comprises an assembly frame 112 which has two distinct parts. A first central part 114 of assembly frame 112 which comprises a frame 115 of an inverted parabolic shape on which two attachment plates 120, 121 which can move in rotation and on which the two guide wheels 26' are mounted are mounted back to back. Just one of the two wheels has been shown in FIG. 11. A second part comprising two identical side portions 116, 118, opposite to each other in relation to frame 115 and comprising the side surfaces of said frame 112. Portions 116 and 118 define spaces for mounting guide assemblies and are arranged substantially perpendicularly to the front surfaces of said guide wheels 26', facing each other. These mounting spaces are of one piece with frame 112 when it is transported from the storage area to an area for preparation and mounting of the said guide assemblies, but they may also be disconnected and withdrawn away from first part 114 of frame 112 during the stage of mounting the guide assemblies on guide wheels 26' in order to allow the operators better mobility.

Thus, and as described above for the preparation of machines, the successive stages in the mounting of the guide assemblies will now be described.

In a first stage of assembly frame 112 is brought from a storage area to a preparation area located close to the machine. In a second assembly stage the storage spaces are disconnected in order to create space between first part 114 and the two side portions 116, 118 of the assembly frame thus allowing the operator sufficient space to move and easily install the guide assemblies on said guide wheels 26'. Assembly frame 112 is provided with a motor drive by means of which attachment plates 120, 121 and consequently the guide wheels can be driven in rotation on frame 112 in such a way that the guide assemblies can be installed on the said guide wheels one by one. In a third stage both the inclination of the guide assemblies in relation to the radii of the wheel are adjusted by means of outer ring 106 and the angle of lay of the carbon armor filaments is adjusted by means of inner ring 104. Subsequently the raised supports which will remain permanently in place on the front of the supporting wheels of the machine are installed, and then the guide wheels are respectively fitted onto the supporting wheels in order to immobilize them there coaxially by means of the raised supports.

The invention claimed is:

1. A guide wheel intended for laying a layer of carbon armor filaments around a tubular core to manufacture a flexible tubular pipe suitable for the transport of hydrocarbons, the guide wheel having both a central recess and an inner circular edge bordering the central recess and also a peripheral circular edge which extends coaxially at a distance from the inner circular border, the guide wheel comprising a plurality of guide assemblies capable of guiding a plurality of carbon armor filaments respectively in translation through the peripheral circular edge, the guide assemblies being mounted around the central recess to guide the carbon armor filaments when the tubular core is driven in translation through the central recess, while the guide wheel is driven in rotation in such a way that the carbon armor filaments can be simultaneously helically wound around the tubular core, wherein each of the guide assemblies comprises a peripheral return member mounted in the peripheral circular edge to guide the carbon armor filaments towards the inner circular edge along a first curved passageway and also a central return member mounted in the inner circular edge to guide the carbon armor filaments along a second curved passageway opposite to the wheel, wherein the peripheral return member and the central return member are connected together by means of a straight guide member, and wherein the peripheral return member and the central return member can be adjusted in rotation with respect to each other along the axis of the straight guide member.

2. The guide wheel as claimed in claim 1, wherein the straight guide member is telescopically adjustable.

3. The guide wheel as claimed in claim 1, wherein each of the guide assemblies further comprises an attachment plate pivotally mounted on the central return member and a member for adjusting the relative position of the central return member and the attachment plate.

4. The guide wheel as claimed in claim 1, wherein the peripheral return member comprises an upstream guide member intended to be attached through the peripheral circular edge.

5. The guide wheel as claimed in claim 4, wherein the upstream guide member comprises a rotationally mounted tubular guide end member, the tubular guide end member having an inlet slot.

6. The guide wheel as claimed in claim 1, wherein the central return member comprises a downstream guide member, the downstream guide member comprising a rotationally mounted downstream tubular guide member.

7. The guide wheel as claimed in claim 1, wherein the peripheral return member and the central return member of each of the said guide assemblies are adjusted to be in an extension of each other along a chord of the wheel.

8. A method for assembling an assembly for laying a layer of carbon armor filament around a tubular core to manufacture a flexible tubular pipe intended for the transport of hydrocarbons, the method comprising the steps of:

providing a machine comprising at least one supporting wheel having a central passage opening to allow the passage of a tubular core through the at least one supporting wheel, the at least one supporting wheel comprising a plurality of bobbins capable of storing a plurality of carbon armor filaments so that the carbon armor filaments can be drawn in rotation around the tubular core, while the tubular core is driven in movement through the at least one supporting wheel to helically wind the carbon armor filaments onto the core;

providing a guide wheel, the guide wheel having both a central recess and an inner circular edge bordering the central recess and also a peripheral circular edge which extends coaxially at a distance from the inner circular border, the guide wheel comprising a plurality of guide assemblies capable of guiding a plurality of carbon armor filaments respectively in translation through the peripheral circular edge, the guide assemblies being mounted around the central recess to guide the carbon armor filaments when the tubular core is driven in translation through the central recess, while the guide wheel is driven in rotation in such a way that the carbon armor filaments can be simultaneously helically wound around the tubular core, wherein each of the guide assemblies comprises a peripheral return member mounted in the peripheral circular edge to guide the carbon armor filaments towards the inner circular edge along a first curved passageway and also a central return member mounted in the inner circular edge to guide the carbon armor filaments along a second curved passageway opposite to the wheel, wherein the peripheral return member and the central return member are connected to the wheel, wherein the peripheral return member and the central return member are connected together by means of a straight guide member, and wherein the peripheral return member and the central return member can be adjusted in rotation with respect to each other along the axis of the straight guide member; and coaxially mounting the guide wheel on the at least one supporting wheel.

9. The assembly method as claimed in claim 8, further comprising providing an assembly frame comprising locking members capable of mounting and locking the guide wheel on the assembly frame.

10. The assembly method as claimed in claim 9, wherein the assembly frame further comprises a motor drive to manipulate the guide wheel.

11. The assembly method as claimed in claim 9, wherein the stage of fitting the guide wheel comprises the following stages:
   delivering the assembly frame to the vicinity of the machine;
   unlocking the locking members;
   installing the guide assemblies;
   adjusting the guide assemblies;
   fitting raised supports onto the at least one supporting wheel; and
   offering up the guide wheel to the at least one supporting wheel in order to attach it by the raised supports.

\* \* \* \* \*